Aug. 12, 1958 H. C. MILLER 2,846,826
MOUNTING AND TRUING DEVICE FOR PERIPHERAL TYPE
CIRCULAR GRINDING OR CUTTING WHEELS
Filed Feb. 26, 1957 3 Sheets-Sheet 1
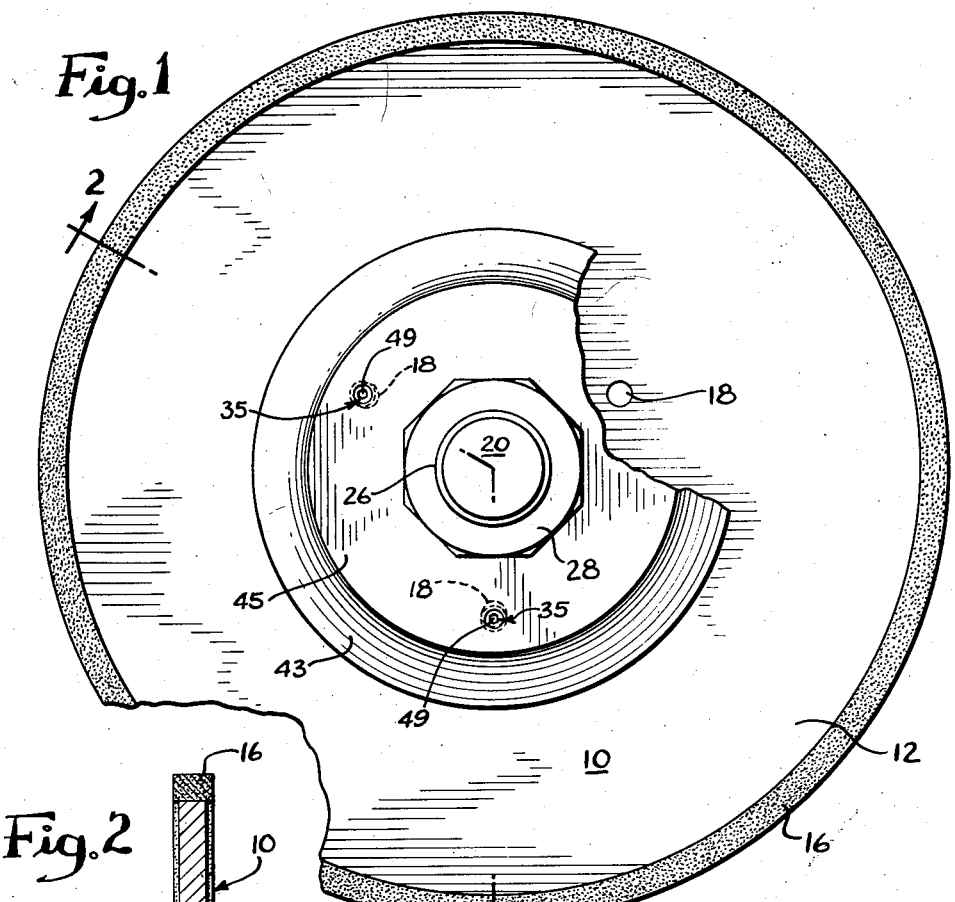
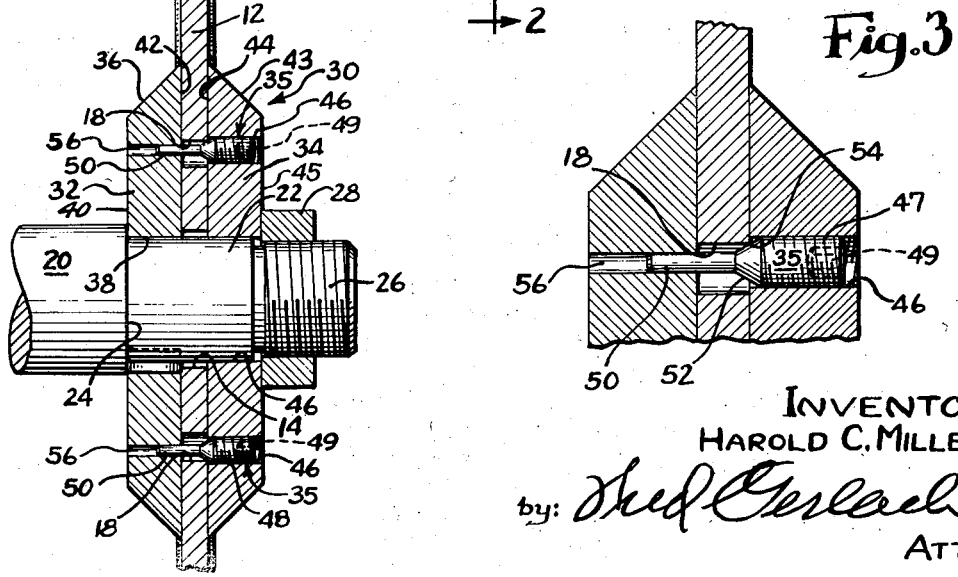
INVENTOR
HAROLD C. MILLER
ATTY.

Aug. 12, 1958 H. C. MILLER 2,846,826
MOUNTING AND TRUING DEVICE FOR PERIPHERAL TYPE
CIRCULAR GRINDING OR CUTTING WHEELS
Filed Feb. 26, 1957 3 Sheets-Sheet 2
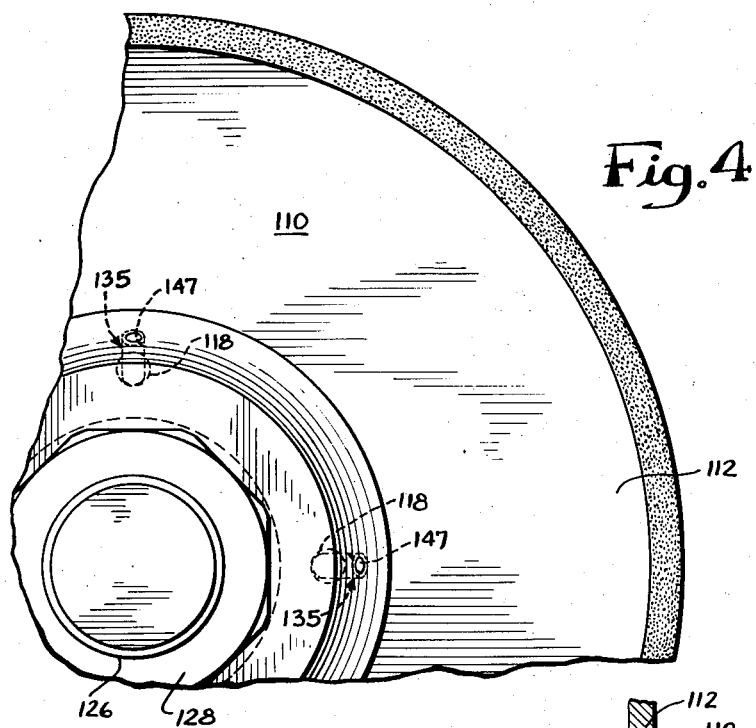
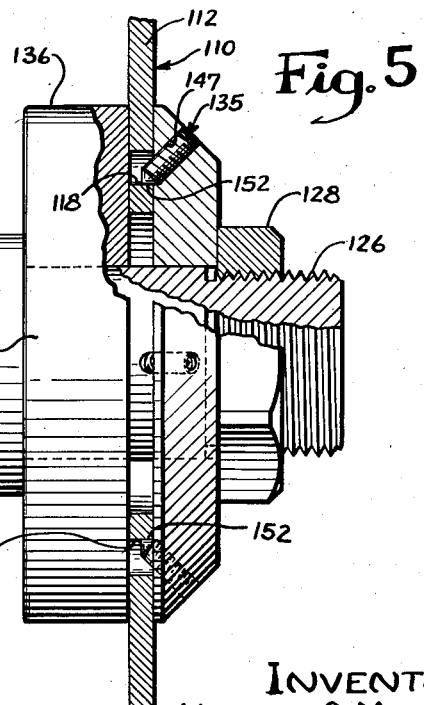
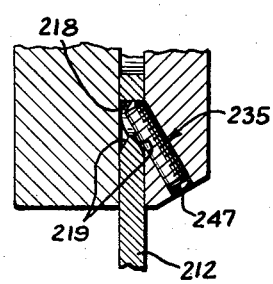
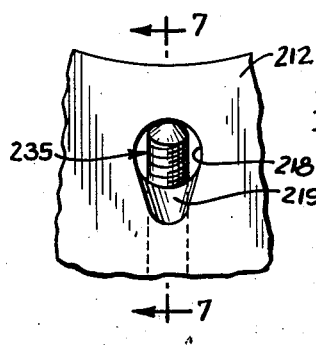
INVENTOR
HAROLD C. MILLER
by: Fred Gerlach
ATTY.

Aug. 12, 1958 H. C. MILLER 2,846,826
MOUNTING AND TRUING DEVICE FOR PERIPHERAL TYPE
CIRCULAR GRINDING OR CUTTING WHEELS
Filed Feb. 26, 1957 3 Sheets-Sheet 3
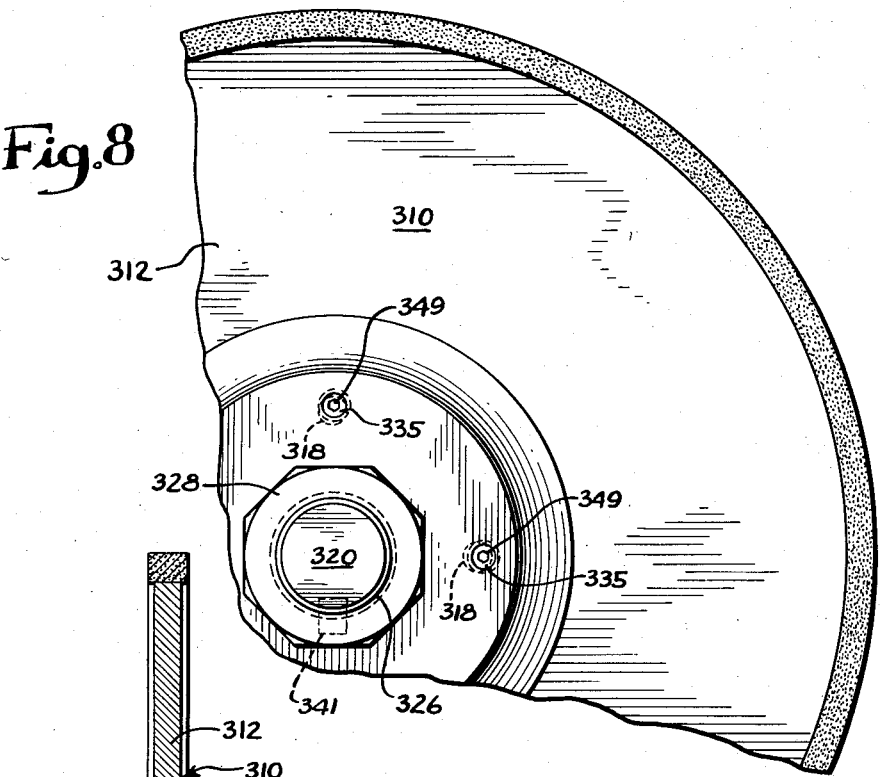
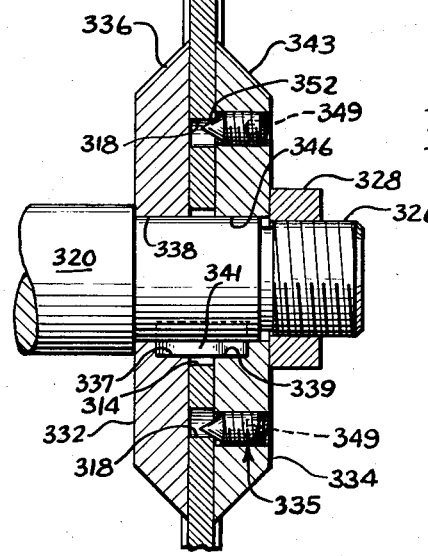
INVENTOR
HAROLD C. MILLER
by: Fred Gerlach
ATTY.

United States Patent Office 2,846,826
Patented Aug. 12, 1958

2,846,826

MOUNTING AND TRUING DEVICE FOR PERIPHERAL TYPE CIRCULAR GRINDING OR CUTTING WHEELS

Harold C. Miller, Chicago, Ill., assignor to Super-Cut, Inc., Chicago, Ill., a corporation of Illinois Application February 26, 1957, Serial No. 642,531

8 Claims. (Cl. 51—168)

The present invention relates to an improved combined mounting and truing device whereby a cutting tool such as a peripheral type diamond saw blade, or an abrading tool such as a grinding wheel, may be operatively mounted on a central drive spindle or arbor and the peripheral regions thereof brought into precise axial coincidence with the axis of rotation of the spindle.

In the operation of cutting and grinding tools, and particularly in the operation of peripheral type diamond cutting tools or saw blades, only extremely small eccentric tolerances are permitted between the axis of the central drive spindle or arbor and the axis of the wheel, both from the standpoint of accurate control of the desired work contour and of vibrational effects in the grinding wheel itself during free rotation thereof. Thus, where there is any discrepancy or lack of coincidence between the axis of the peripheral ring-like diamond matrix of the central mounting opening in the wheel, the grinding wheel cannot be mounted for proper operation on the central drive spindle or on the adaptor associated with such spindle and, at least for certain types of precision work, as for example, in chip breaker operations, the wheel must be discarded. Likewise, where there is a comparatively wide tolerance between the diameter of the spindle, or the cylindrical mounting surface of the grinding wheel adaptor and the diameter of the central opening in the grinding wheel, it is difficult to mount the wheel on the spindle in a condition of either trueness or balance, or both, and much time is consumed in an effort to obtain these conditions.

The present invention is designed to overcome the above noted limitations that are attendant upon the use of conventional saw blades, grinding wheels and the like and, toward this end it contemplates the provision of a novel mounting for the grinding wheel whereby the latter may be operatively mounted on the drive spindle or arbor and adjusted thereon through very fine limits of adjustment and thereby brought to a precise position of trueness and condition of balance.

It is among the principal objects of the invention to provide an adjustable grinding wheel mounting of the character briefly outlined above, and it is another important object to provide an adjusting means for varying the radial position of the grinding wheel on its drive spindle or adaptor in such a manner that the eccentricity of the former may be brought within tolerable limits with a minimum of ease and whereby the adjusting means is conveniently accessible to the operator from the front end of the spindle, both at the time of initial installation of the grinding wheel or at any other time thereafter.

Rotary cutting tools of the type with which the present invention is concerned are usually mounted on and rotated by a power driven spindle of such diameter that it may snugly receive the central aperture of the cutting wheel or disc thereover and, when so received, the wheel or disc is adapted to be clamped in operative position between a pair of clamping collars. In actual practice it has been found that due to manufacturing tolerances, or due to wear of the spindle, the latter does not always accurately fit the hole in the grinding wheel or disc and this is one cause of possible eccentricity as outlined above. Where the spindle has become worn and its overall diameter is less than the diameter of the hole through which it extends, great difficulty is encountered in centering the wheel or disc on the spindle. Furthermore, if such a condition arises and the wheel is allowed to touch the spindle at only one point, vibrational effects are set up which are highly undesirable. These limitations are also overcome by the present invention and the improved mounting means is so designed that accurate centering of the grinding wheel on the spindle may be effected regardless of discrepancies in manufacturing tolerances or of spindle and hole misfit due to worn parts.

Because of the large number of machines currently manufactured for use with rotary saw blades and grinding wheels of the character set forth above having driving spindles which vary in size, it has been necessary for the manufacturer to produce a wide variety of saw blades or grinding wheels with different diameter center holes and for the jobber to keep a large inventory of the abrasive tools, many of them having the same diameter. Such a practice of maintaining a large stock of tools which do not vary in operating size is, of course, uneconomical, and efforts to adapt saw blades and grinding wheels having a central aperture of large diameter to driving spindles of smaller diameter by the use of bushing-type inserts have not proven satisfactory due to the difficulty of properly centering the adaptor device within the opening. Furthermore, the application of bushing-type adaptors to the spindle at the time of initial installation and the removal of the adaptor when cutting operations are complete, involves considerable manipulation and is thus time consuming. These last mentioned limitations are overcome by the provision of the present tool mounting which is universal in its application so that it will accommodate not only wheels and discs which are manufactured under the special provisions of the present invention but also conventional grinding wheels and discs. Such wheels and discs as are constructed in accordance with the principles of the present invention may be constructed with a central mounting aperture at least as large or slightly larger than the largest conventional size spindle ordinarily encountered and, by the provisions of the present invention, these wheels may be mounted upon all spindles of smaller diameter and accurately adjusted or centered thereon without the use of bushings or special adaptors which, as stated above, are seldom satisfactory.

Conventional mountings of the type under consideration herein, and particularly mountings for discs or wheels of large diameter, make provision for directly transmitting the torque from the driving spindle to one or both of the clamping collars, as well as to the grinding wheel itself. This is usually accomplished by the use of a pin-and-hole connection, a keyway, or a combination of these expedients. According to the present invention, the use of such torque-transmitting devices is not precluded where the same are furnished although they may be omitted if desired and the specific adjusting means of the present invention, as constructed in one embodiment of the same, may be relied upon to supply the necessary torque transmission from one of the clamping collars to the grinding wheel. In another embodiment of the adjusting means, torque may be transmitted from both clamping collars to the grinding wheel, all in a manner that will be made clear subsequently.

The present invention is applicable to comparatively rigid grinding discs and wheels, as, for example, those which are constructed from steel plate stock. The invention is also applicable to non-metallic wheels, for example, wheels the bodies of which are formed of a resinoid or other plastic material not having the rigidity of metal and it is a further object of the invention to adapt such wheels to the purposes and attainments of the invention.

It is yet another object of the invention to provide a truing device of this character wherein the adjustments may be made with the grinding wheel or disc installed on the spindle without requiring disassembly of parts, removal and reapplication of the wheel from and to the spindle, or rearrangement of the various parts of the device.

The provision of a mounting device for grinding wheels and the like which is extremely simple in its construction and which may, therefore, be manufactured at a comparatively low cost; one which may be manufactured as original equipment or which may conveniently be applied to existing equipment; one which is possessed of a minimum number of relatively moving parts and which, therefore, is unlikely to get out of order; one which is rugged and durable and which, therefore, is possessed of a comparatively long life, and one which otherwise is well adapted to perform the services required of it, are further desirable features which have been borne in mind in the production and development of the present invention.

In the accompanying three sheets of drawings forming a part of this specification several embodiments of the invention have been shown.

In these drawings:

Fig. 1 is a front elevational view of a peripheral type grinding wheel showing the same operatively mounted on a central drive spindle by means of the present truing device, certain parts of the device being broken away to more clearly reveal the nature of the invention;

Fig. 2 is a sectional view taken substantially along the line 2—2 of Fig. 1;

Fig. 3 is enlarged fragmentary detail view of a portion of the structure shown in Fig. 2;

Fig. 4 is a fragmentary front elevational view similar to Fig. 1 showing a modified form of mounting means for the grinding wheel on the central spindle;

Fig. 5 is a side elevational view, partly in section, of the structure shown in Fig. 4;

Fig. 6 is a fragmentary side elevational view of a small portion of a grinding wheel body taken in the vicinity of cam surface-providing opening in the body as formed in connection with another modified form of the invention;

Fig. 7 is a sectional view taken substantially along the line 7—7 of Fig. 6;

Fig. 8 is a fragmentary front elevational view similar to Figs. 1 and 4 showing a still further modified form of the invention; and Fig. 9 is a sectional view taken substantially along the line 9—9 of Fig. 8.

Referring now to the drawings in detail and in particular to Figs. 1 to 3, inclusive, wherein one form of the invention has been illustrated, a peripheral type diamond grinding wheel has been designated in its entirety at 10 and includes the usual wheel body or annulus 12 having a central mounting or arbor opening 14 formed therein. A peripheral matrix assembly 16 consisting of crushed or fragmented diamonds is carried at the outer circular peripheral edge of the wheel body 12. The grinding wheel 10 is of more or less conventional construction and design but it is modified according to the present invention by the provision of a plurality of equally and circumferentially spaced holes 18 which extend transversely through the wheel body 12 at regions spaced slightly outwardly from the central opening 14. While three such holes have been shown and described herein, it will be understood that a greater number of such holes may be provided if desired. The function of the holes 18 will be made clear presently.

The grinding wheel 10 is shown as being mounted on a conventional arbor or spindle 20 the forward end of which is reduced as at 22 to provide a forwardly facing radially disposed annular clamping shoulder 24. The reduced portion 22 provides a cylindrical mounting surface for the wheel-mounting means of the present invention and forwardly of the surface 22 the spindle is further reduced and threaded as at 26 to receive thereon a clamping nut 28. It will be understood, of course, that the arbor or spindle 20 may constitute a part of a conventional grinding machine (not shown) which may be of any suitable type.

The mounting device of the present invention is designated in its entirety at 30 and, in the main, it is comprised of two annular parts including a rear clamping collar 32, a front annular clamping collar or ring 34, and the previously mentioned clamping nut 28. The device further includes a series of adjusting elements or centering devices 35 of which, in the present illustrated embodiment of the invention, there are three in number, each being designed for cooperation with one of the holes 18 formed in the wheel body 12 for centering and adjusting purposes as will appear presently.

As shown in Figs. 2 and 3, the rear clamping ring 32 is in the form of a relatively thick circular plate having a forwardly and outwardly bevelled peripheral surface 36. The ring 32 is formed with a central opening 38 therethrough designed for reception over the cylindrical spindle surface 22 with a snug fit and the rear face 40 of the ring is designed for engagement with the forwardly facing shoulder 24 when the ring is in position on the spindle. The forward face 42 of the ring 32 extends radially and is designed for clamping engagement with the rear side of the wheel body 12. The front clamping ring 34 is similarly in the form of a relatively thick circular plate having a rearwardly and outwardly bevelled peripheral surface 43, a rearwardly facing radial clamping surface 44 which opposes the clamping surface 42 and is adapted to bear against the front side of the wheel body 12, a front radial surface 45 designed for engagement with the clamping nut 28, and a central opening 46 by means of which the ring may be mounted on the arbor surface 22. The rings 32 and 34 are adapted to straddle the inner peripheral regions of the wheel body 12 and the clamping nut 28 is adapted to be tightened on the threaded shank portion 26 of the spindle 20 to draw the two rings 32 and 34 together, thus clamping the wheel body between the opposed clamping surfaces 42 and 44 in selected positions of adjustment of the wheel under the control of the various centering devices 35 in a manner that will be made clear presently.

The centering devices are identical in design and each is in the form of an adjusting screw having a relatively short body portion 47 which is threaded throughout its entire length and which is formed with an Allen head socket 49 in one end thereof designed for reception therein of an Allen wrench for manipulation of the screw. The body portion 47 is threadedly received within a threaded bore 48 which extends transversely through the clamping ring 34 and which is designed for partial registry with one of the holes 18 formed in the wheel body when the parts are in their assembled relationship. The screw 35 is formed with an axially extending pilot stem 50 of reduced diameter and the stem and body are connected by an intermediate portion presenting a frusto-conical surface 52 designed for camming engagement with the forward circular edge or rim 54 (Fig. 3) of one of the openings or holes 18 provided in the wheel body 12 for wheel alignment or adjusting purposes. In the position in which the various adjusting screws 35 are illustrated in Figs. 2 and 3, a portion of the frusto-conical surface 52 and a portion of the pilot stem 50 project through one of the holes 18 and the end region of the stem 50 is piloted in a bore 56 formed in the clamping ring 32 in register with one of the threaded bores 48.

It should be observed at this point that when the various parts are in position on the arbor or spindle 20 the axes of the threaded bores 48 are offset slightly radially outwardly from the axes of the corresponding holes 18 provided in the wheel body 12 so that when the centering devices or screws 35 are in any selected position of adjustment, the frusto-conical surface 52 of each screw will, when tightened, make contact with the outermost radial region on the circular rim 54 of the hole 18. The diameter of the screw body 47, and consequently of the large base of the cone frustum 52 is substantially equal to the diameter of the hole 18 so that the range of adjustment of each centering device will be the difference between the radius of the pilot stem 50 and the radius of the screw body 47, the entire range being traversed while the rim 54 of the hole 18 moves along the full slant height of the cone frustum 52.

In the operation of the form of mounting device shown in Figs. 1 to 3, inclusive, and described above, the clamping ring or collar 32, the grinding wheel body 12, and the clamping collar 34 are inserted over the cylindrical mounting portion 22 of the spindle 20 in the order named and thereafter the clamping nut is threaded onto the threaded portion 26 of the spindle with finger-tight pressure so as to be drawn up loosely against the forward face 45 of the front clamping collar 34. It will be understood, of course, that in the assembly operation just described, the pilot stems 50 of the centering screws 35 are aligned with and passed through the openings 18 and into the bores 56, this being the case whether the assembly on the spindle is made individually or whether the parts 32, 12 and 34 are preassembled and mounted on the spindle as a unit. The opening 14 in the wheel body should be slightly larger than the largest spindle surface 22 ordinarily encountered so that no portion of the wheel body 12 will touch the surface 22 when the adjusting screws 35 are piloted in the bores 56. Since the grinding wheel body 12 is only loosely clamped between the opposed surfaces 42 and 44 of the clamping collars 32 and 24, respectively, turning of the various adjusting screws 35 in one direction or the other may be utilized to bring the grinding wheel to a precise adjustment wherein an indicating instrument or gauge will indicate that the diamond matrix 16 of the grinding wheel 10 is true with respect to the axis of the spindle 20. Truing of the grinding wheel in this manner will ordinarily compensate to a large extent for any unbalanced forces which might otherwise arise in the rotating wheel and the latter will be in perfect balance, as well as being true on the driving spindle.

During the various adjusting operations, turning of any one of the adjusting screws 35 so as to thread the screw into the opening 46 provided for it will bring the frusto-conical surface 52 thereof into camming engagement with the rim 54 of the opening 18 and apply a radial thrust to the grinding wheel and cause the same to be moved radially in one direction or another, depending upon the particular setting of the other adjusting elements 35. Experience will dictate the particular order and extent of adjustment of the various elements which may be necessary to effect the desired final adjustment. The adjustment of the last element 35 in the series will effect a three way binding or locking of the wheel body 12. After the necessary adjustments have been made and the wheel body 12 thus locked in its final position, the clamping screw 28 may be tightened against the front face of the wheel body 12 and the machine set into operation.

It is to be noted that the pilot stems 50 are provided so as to prevent binding of the relatively short threaded body portions 47 of the adjusting screws 35 in their threaded environs, as well as to establish a direct drive from one of the clamping collars to the other. The engagement of the frusto-conical surfaces 52 of the adjusting elements 35, in addition to maintaining the wheel body 12 in its desired adjusted position, also serves to establish a drive between the clamping collars and the wheel body and thus augment the frictional driving engagement between these parts.

In the form of the invention shown in Figs. 4 and 5, the principal parts of the mounting device remain substantially the same as in the form of the invention previously described except for certain differences in shape characteristics between the corresponding clamping collars and a different type of cooperation between the interengaging adjusting parts associated with the grinding wheel body and front clamping collar. To avoid needless repetition of description similar reference characters of a higher order have been applied to the corresponding parts in the two sets of figures representing the two forms of the invention respectively. In the modified form of the invention, the rear clamping collar 132 has a cylindrical peripheral surface 136 and is devoid of pilot holes. The front clamping collar 134 is provided with four, instead of three, screw-receiving threaded bores 147 which extend inwardly from the bevelled peripheral surface 143 of the collar. The four adjusting screws 135 are formed with frusto-conical end regions 152 and the pilot stems 50 of the previously described form of the invention have been omitted. The inclination of the adjusting screws from the plane of the grinding wheel body 112 has for illustrative purposes been shown as being in the neighborhood of 45° but it will be understood that other angles of inclination are contemplated, as, for example, 30°. Irrespective, however, of the particular angle of inclination employed, the essential features of the invention are at all times preserved. Where the inclination of the axis of the screws 135 is 45° as shown, the slant angle of the frusto-conical surface 152 will be 45° in order that this surface will engage the cylindrical bore afforded by the hole 118 in a true tangential manner and make substantially coextensive live contact therewith in the overlapping regions thereof. Where the inclination of the axis of the screw 135 is 30°, the slant angle of the frusto-conical surface 152 will be 60°. Thus, the angle of inclination of the axis of the screw will always be a complement of the slant angle of the frusto-conical surface. It should be noted that the diameter of the holes 118 must be sufficiently great as to afford a clearance for the angle of approach of the various adjusting screws 135.

It is believed that the description of the operation of the form of the invention shown in Figs. 1 to 3, inclusive, will, to a large extent, serve for an understanding of the operation of the form shown in Figs. 4 and 5, suffice it to say that a somewhat more positive thrust is offered to the grinding wheel body by the centering screws 135 than by the centering screws 35 since a more effective camming action is obtained against the bores 118 than against the rim portions 54 of the bores 18. In other respects, the construction of the form of the invention shown in Figs. 4 and 5 remains substantially the same as in the previously described form.

It has been stated above that the diameter of the holes 135 in the form of the invention shown in Figs. 4 and 5 must be sufficiently great as to afford a clearance for the angle of approach of the various adjusting screws. However, alternatively, as shown in Figs. 6 and 7, wherein another slightly modified form of the invention has been shown and similar numerals of a still higher order have been employed, the holes 218 may be relieved as at 219 at both end regions thereof to accommodate the inclination of the adjusting screws 235. The dual relief of the holes is effected to permit the grinding wheel body 212 to be reversed upon the arbor or spindle.

In the form of the invention shown in Figs. 8 and 9, the principal parts of the mounting device again remain substantially the same as in all of the previously described forms of the invention and again reference numerals of a still higher order have been applied to the corresponding parts. In this latter form of the invention, the front and rear clamping collars 332 and 334, the clamping nut 328, the arrangement of screw-receiving holes in the front clamping collar 334, the arrangement of the screw-engaging holes 318 in the grinding wheel body 312 and the design of the screws 335 remain substantially the same as in the form of the invention shown in Fig. 1 with the exception that four equally spaced adjusting screws are provided and these screws are devoid of pilot stems. To establish a driving connection between the two collars 332 and 334, a pair of aligned keyways 337 and 339 are formed in the central mounting bores 338 and 346, respectively, of the collars, the keyways receiving therein a common driving key 341. This latter form of the invention will be found useful where relatively large diameter or heavy duty grinding wheels are concerned inasmuch as the driving thrust exerted by the adjusting screws is partially compensated for by the application of torque to the grinding wheel by both clamping collars 332 and 334 which are caused to be rotated in unison and are prevented from relative rotation due to slippage by the provision of the driving key 341. In all other respects, the construction and operation of this form of the invention remains substantially the same as has been described in connection with the form of the invention shown in Figs. 1 to 3, inclusive.

The invention is not to be limited to the exact arrangement of parts shown in the accompanying drawings or described in this specification as various changes in the details of construction may be resorted to without departing from the spirit of the invention. For example, while in the various forms of the invention illustrated herein, the grinding wheel body has been described as being formed of metal, the same may be formed of other materials as, for example, a suitable thermosetting resin. In such an instance, the holes provided therein and which are designed for cooperation with the adjusting devices, may be formed in suitable metal inserts embedded in the plastic material of the grinding wheel body. Only insofar as the invention has particularly been pointed out in the accompanying claims is the same to be limited.

Having thus described the invention what I claim as new and desire to secure by Letters Patent is:

1. In a device for operatively mounting a peripheral type grinding wheel or the like having a wheel body provided with a mounting opening therein on a machine spindle between a shoulder normal to and rotating with the spindle and a clamping nut on the forward end of the spindle, in combination, front and rear clamping collars surrounding the spindle between the shoulder and nut in concentric relation with respect to the spindle and in engagement with the opposite faces respectively of the wheel in clamping relation thereto under the influence of said clamping nut, there being an opening in said wheel body extending transversely therethrough at each of at at least three circumferentially spaced regions therearound, each of said openings having a wall surface a portion of which is presented radially inwardly of the wheel body, one of said clamping collars being formed with an interiorly threaded bore in at least partial register with each of said openings, and an adjusting screw threadedly received in each of said bores and having a cam surface thereon designed for camming engagement with said inwardly presented wall surface of one of said openings whereby rotational movements of the screw in a direction tending to advance the screw in its respective bore toward said inwardly presented surface will impart increments of shifting movement to the grinding wheel body in a radial plane relative to the axis of said spindle.

2. In a device for operatively mounting a peripheral type grinding wheel or the like having a wheel body provided with a mounting opening therein on a machine spindle between a shoulder normal to and rotating with the spindle and a clamping nut on the forward end of the spindle, the combination set forth in claim 1 wherein the cam surface on each of said adjusting screws is of frusto-conical configuration with the axis of the cone in coincidence with axis of the screw.

3. In a device for operatively mounting a peripheral type grinding wheel or the like having a wheel body provided with a mounting opening therein on a machine spindle between a shoulder normal to and rotating with the spindle and a clamping nut on the forward end of the spindle, the combination set forth in claim 1 wherein said interiorly threaded bores project completely through the clamping collar in which they are formed in a direction normal to the plane of the grinding wheel and wherein the cam surfaces on said adjusting screws are of frusto-conical configuration with the axes of the cones in coincidence with the axes of the screws respectively, the axes of said bores being slightly offset radially outwardly of the axes of the openings in the wheel body whereby said frusto-conical cam surfaces engage one rim fo the openings in said wheel body.

4. In a device for operatively mounting a peripheral type grinding wheel or the like having a wheel body provided with a mounting opening therein on a machine spindle between a shoulder normal to and rotating with the spindle and a clamping nut on the forward end of the spindle, front and rear clamping collars surrounding the spindle between the shoulder and nut in concentric relation with respect to the spindle and in engagement with the opposite faces respectively of the wheel in clamping relation thereto under the influence of said clamping nut, there being an opening in said wheel body extending transversely therethrough at each of at least three circumferentially spaced regions therearound, each of said openings having a wall surface a portion of which is presented radially inwardly of the wheel body, one of said clamping collars being formed with an interiorly threaded bore extending inwardly from the outer face of the collar at an angle to the plane of the grinding wheel of between substantially 30° and 45° in register with each of said openings, and an adjusting screw threadedly received in each of said bores and having a cam surface thereon designed for camming engagement with the inner wall of one of said openings whereby rotational movements of the screw in a direction tending to advance the screw in its respective bore toward said wall surface will impart increments of shifting movement of the grinding wheel body in a radial plane relative to the axis of said spindle.

5. In a device for operatively mounting a peripheral type grinding wheel or the like having a wheel body provided with a mounting opening therein on a machine spindle between a shoulder normal to and rotating with the spindle and a clamping nut on the forward end of the spindle, the combination set forth in claim 7 wherein the cam surfaces on said adjusting screws are of conical configuration and have a slant angle which is substantially a 90° complement of the angle of inclination of said interiorly threaded bores.

6. In a device for operatively mounting a peripheral type grinding wheel or the like having a wheel body provided with a mounting opening therein on a machine spindle between a shoulder normal to and rotating with the spindle and a clamping nut on the forward end of the spindle, front and rear clamping collars surrounding the spindle between the shoulder and nut in concentric relation with respect to the spindle and in engagement with the opposite faces respectively of the wheel in clamping relation thereto under the influence of said clamping nut, there being an opening in said wheel body extending transversely therethrough at each of at least three circumferentially spaced regions therearound, each of said openings having a wall surface a portion of which is presented radially inwardly of the wheel body, one of said clamping collars being formed with an interiorly threaded bore extending inwardly from the outer face of the collar at an angle to the plane of the grinding wheel of between substantially 30° and 45° in register with each of said openings, and an adjusting screw threadedly received in each of said bores and having a cam surface thereon designed for camming engagement with the inner wall of one of said openings whereby rotational movements of the screw in a direction tending to advance the screw in its respective bore toward said wall surface will impart increments of shifting movement of the grinding wheel body in a radial plane relative to the axis of said spindle, the material of said grinding wheel body in the vicinity of each of said openings therein being relieved on the side of the body adjacent its respective adjusting screw to provide a clearance region for entry of the screw into the opening.

7. In a device for operatively mounting a peripheral type grinding wheel or the like having a wheel body provided with a mounting opening therein on a machine spindle between a shoulder normal to and rotating with the spindle and a clamping nut on the forward end of the spindle, in combination, front and rear clamping collars surrounding the spindle between the shoulder and nut in concentric relation with respect to the spindle and in engagement with the opposite faces respectively of the wheel in clamping relation thereto under the influence of said clamping nut, there being an opening in said wheel body extending transversely therethrough at each of at at least three circumferentially spaced regions therearound, each of said openings presenting a cylindrical wall having a circular rim at each end thereof, one of said clamping collars being formed with an interiorly threaded bore in at least partial register with each of said openings, and an adjusting screw threadedly received in each of said bores and having a cam surface thereon designed for camming engagement with one rim of one of said openings whereby rotational movements of the screw in a direction tending to advance the screw in its respective bore toward said rim will impart increments of shifting movement to the grinding wheel body in a plane normal to the axis of said spindle, said adjusting screw projecting completely through said one opening and being piloted in the other clamping collar.

8. In a device for operatively mounting a peripheral type grinding wheel or the like having a wheel body provided with a mounting opening therein on a machine spindle between a shoulder normal to and rotating with the spindle and a clamping nut on the forward end of the spindle, in combination, front and rear clamping collars surrounding the spindle between the shoulder and nut in concentric relation with respect to the spindle and in engagement with the opposite faces respectively of the wheel in clamping relation thereto under the influence of said clamping nut, there being an opening in said wheel body extending transversely therethrough at each of at at least three circumferentially spaced regions therearound, each of said openings having a wall surface a portion of which is presented radially inwardly of the wheel body, one of said clamping collars being formed with an interiorly threaded bore in at least partial register with each of said openings, an adjusting screw threadedly received in each of said bores and having a cam surface thereon designed for camming engagement with said inwardly presented wall surface of one of said openings whereby rotational movements of the screw in a direction tending to advance the screw in its respective bore toward said inwardly presented surface will impart increments of shifting movement to the grinding wheel body in a radial plane relative to the axis of said spindle, and means establishing a driving connection between each of said clamping collars and said spindle.

References Cited in the file of this patent
UNITED STATES PATENTS

| | | |
|---|---|---|
| 763,469 | Ellis | June 28, 1904 |
| 2,675,653 | Bryant | Apr. 20, 1954 |